United States Patent
Chen

(10) Patent No.: US 6,679,463 B1
(45) Date of Patent: Jan. 20, 2004

(54) SUPPORT WITH MULTI-STAGE CLAMPING MECHANISM

(75) Inventor: Zhen-Bang Chen, Taipei (TW)

(73) Assignee: Kye Systems Corp., Taipei (TW)

( * ) Notice: Subject to any disclaimer, the term of this patent is extended or adjusted under 35 U.S.C. 154(b) by 0 days.

(21) Appl. No.: 10/458,248

(22) Filed: Jun. 11, 2003

(51) Int. Cl.[7] .............................................. A47G 29/00

(52) U.S. Cl. ............... 248/126; 248/229.12; 248/316.4; 248/918; 396/428

(58) Field of Search .............................. 248/126, 187.1, 248/229.1, 229.12, 229.21, 229.2, 229.22, 228.3, 918, 316.1, 316.4; 396/421, 428

(56) References Cited

U.S. PATENT DOCUMENTS

| | | | |
|---|---|---|---|
| 6,431,507 B2 | * | 8/2002 | Prather et al. ............... 248/166 |
| 6,481,681 B1 | * | 11/2002 | Stunkel et al. ......... 248/231.31 |
| 6,579,017 B2 | * | 6/2003 | Wei ............................. 396/428 |
| 6,601,999 B1 | * | 8/2003 | McTeer ....................... 396/420 |

* cited by examiner

Primary Examiner—Ramon O. Ramirez
(74) Attorney, Agent, or Firm—Bacon & Thomas, PLLC

(57) ABSTRACT

A stable, small size, and ajustable support with a multi-stage clamping mechanism that not only provides a clamping function but also a free-standing function and includes a fixing unit and a moving unit to define a first clamping distance via a resilient element. The primary clamp can be rotated individually, or the primary claim and the auxiliary clamp can be rotated together, so as to further provide a second or third clamping distance.

7 Claims, 7 Drawing Sheets

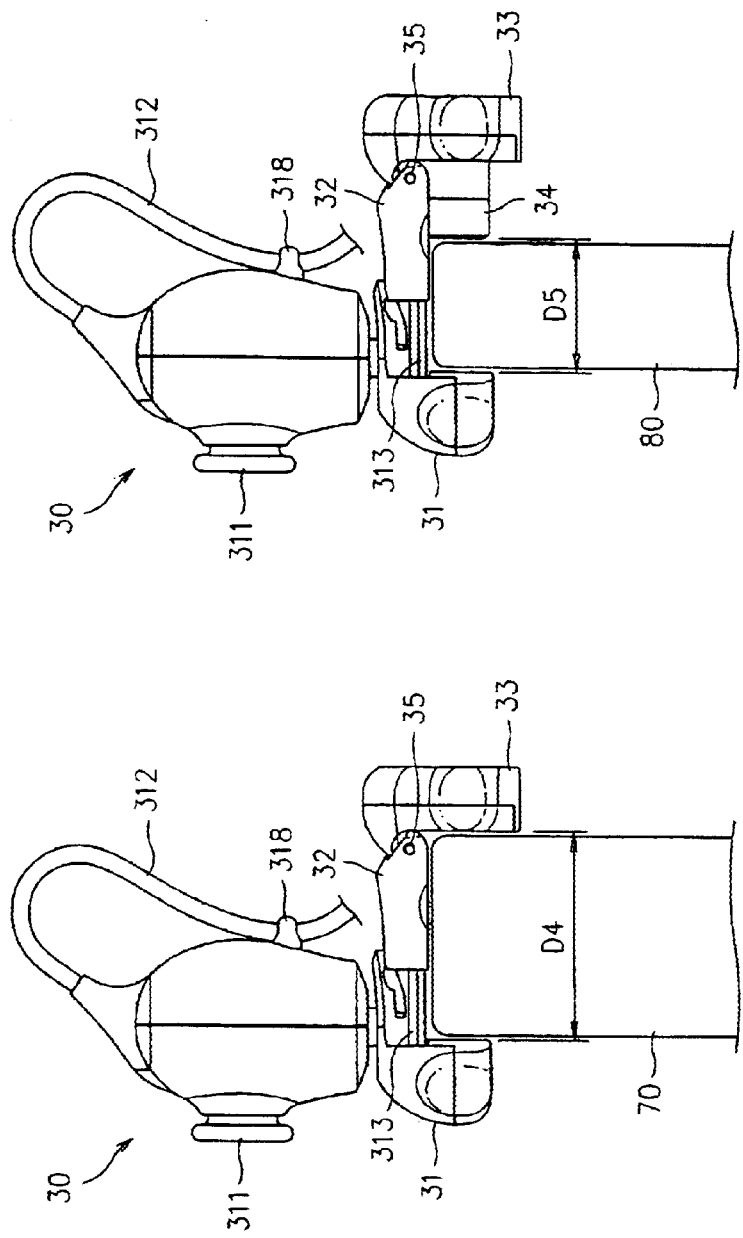

SUPPORT WITH MULTI-STAGE CLAMPING MECHANISM

FIELD OF THE INVENTION

The present invention relates to a clamping support for a portable electrical device such as an image capture device, and particularly to a support having a multi-stage clamping mechanism, which provides either a non-clamping free-standing support function, or a clamping function.

BACKGROUND OF THE INVENTION

With the progress of image processing and data transmitting technologies, image capturing devices are getting more and more popular than ever. A classical image-capturing device has at least a lens and a support located thereunder, where the support can be placed either on a desktop, a CRT type display, or any suitable plane surface. Regarding the distance and height in capturing a proper image, the most common position to put the image-capturing devices is around the top of the display. However, the LCD type display, which is much thinner than that of a CRT, requires a clamping mechanism to support the whole image-capturing device.

Please see FIG. 1, taken from a disclosure published in the Taiwan IPO gazette as TW491527, showing a support for an image-capturing device. The support 202 includes a main body 208, a sliding portion 210, a pair of springs 214, and a lead board 212. The sliding portion 210 can be combined with the main body 208 using the springs 214 located at each side of the main body 208 such that the support can clamp an object between the main body 208 and the sliding portion 210. Furthermore, the lead board 212 can increase the weight of the sliding portion 210 to stabilize the support 202 in use. Various defects can still be found as below:

1. Due to the additional weight of the lead board 212, the support 202 is not suitable for carrying.
2. A square and huge body will lead to a wasting of limited space on a working surface.
3. Because of the extra weight of the lead board 212 attached to the sliding portion 210, the springs 214 must be strong enough to give a stable clamping force in order to clamp an object firmly.
4. The distance of travel for the sliding portion 210 under the main body 208 is quite long, which will easily result in jamming.

Another support device can also be found in U.S. Pat. No. 6,431,507. Please see FIGS. 2A and 2B. The support device includes a neck 12 for connecting a camera 10, a main arm 14, a right arm 20, and a left arm 20'. The arms 20 and 20' can be rotated pivotally relative to the neck 12. In addition, the main arm 14 has an end 21, and each of the right arm 20 and left arm 20' has a hook 29, 29'. With the spreading of the right arm 20, 20', the main arm 14, right arm 20 and left arm 20' can support the camera 10 in a standing state. Moreover, the arms 20 and 20' can be rotated forwardly to clamp an object (LCD display) 76 between the arms 20, 20' and the main arm 14. The disadvantages of the support device is as following, 1. The hooks 29 and 29' are clamped at the front surface of the display 76 and might scratch the precious LCD panel when the support is moved carelessly.
2. The way of attaching the display 76 basically is a rotate-to-clamp motion in an opposite direction for main arm 14 and arms 20, 20'. Therefore the thickness of the display 76 has to be carefully limited in a certain range, or the support device will not clamp the object 76 tightly enough.

With respect to the various defects listed above, the applicant has developed the improvement for the electric portable device.

SUMMARY OF THE INVENTION

The primary object of the present invention is to provide a stable, small size, and adjustable support with a multi-stage clamping mechanism, which provides not only a clamping but also a standing function.

The various objects and advantages of the present invention will be more readily understood from the following detailed description when read in conjunction with the appended drawing.

BRIEF DESCRIPTION OF THE DRAWINGS

FIGS. 6A and 6B are other lateral views when clamping an object.

DETAILED DESCRIPTION OF THE PREFERRED EMBODIMENTS

Figure 1:
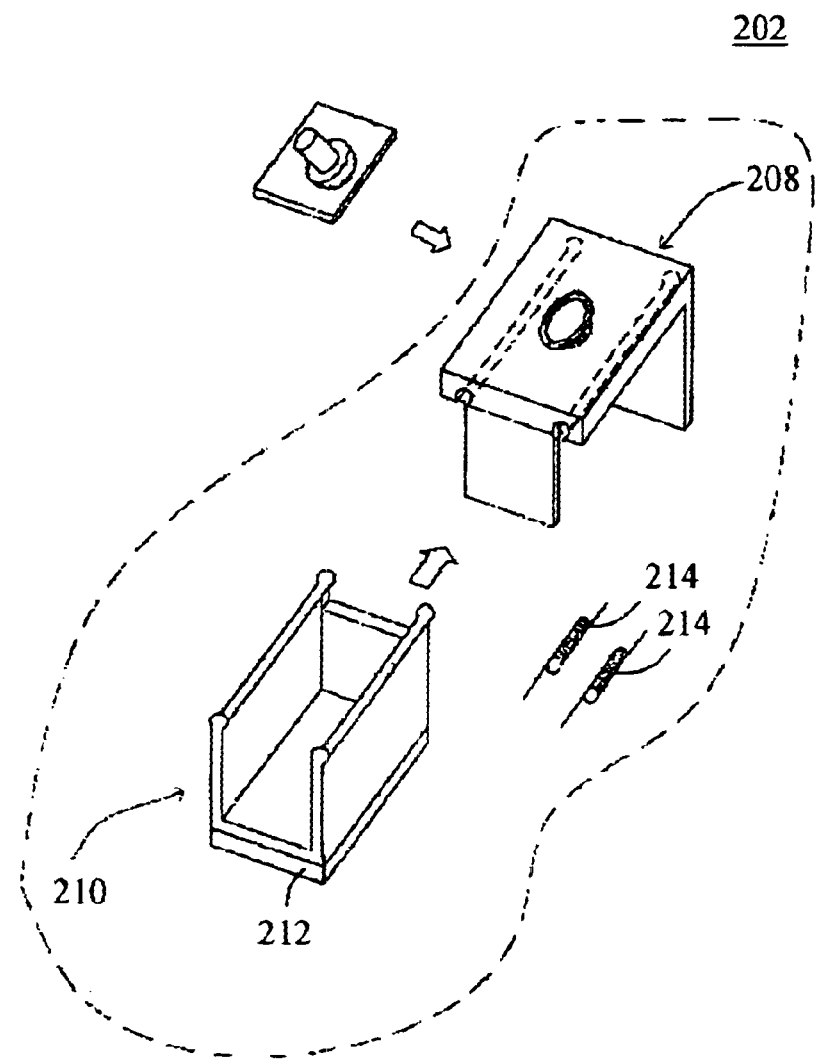
FIG. 1 is a perspective view of a prior art support for an image-capture device.
Figure 2A:
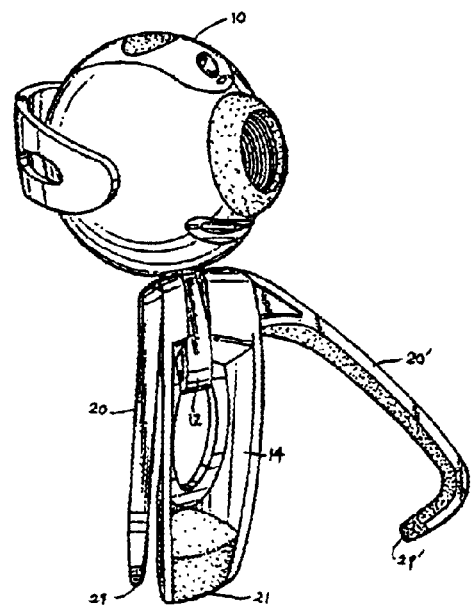
FIG. 2A is a perspective view of another prior art support.
Figure 2B:
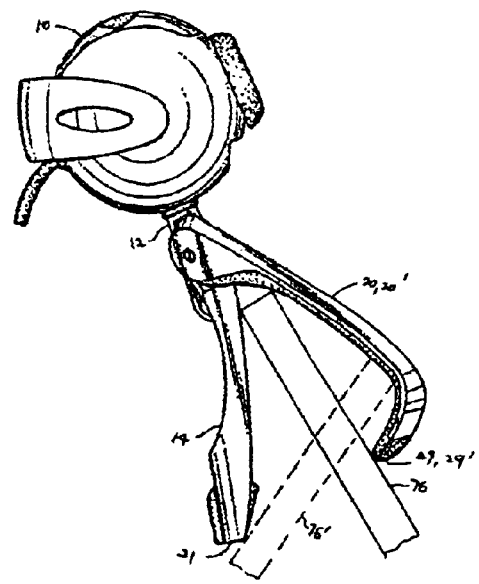
FIG. 2B is a lateral view of the support of FIG. 2A in a clamping state.
Figure 3A:
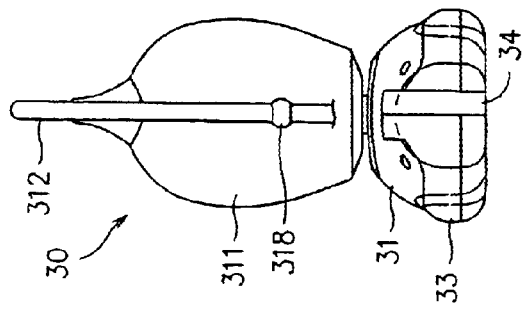
FIG. 3A is a front view of a support constructed in accordance with the principle of the present invention.
Figure 3B:
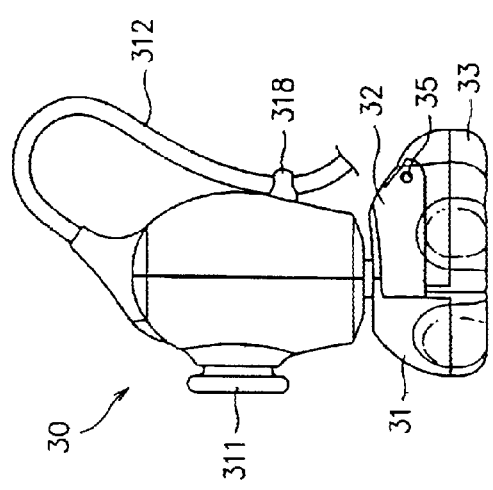
FIG. 3B is a lateral view of the support of FIG. 3A.
Figure 3C:
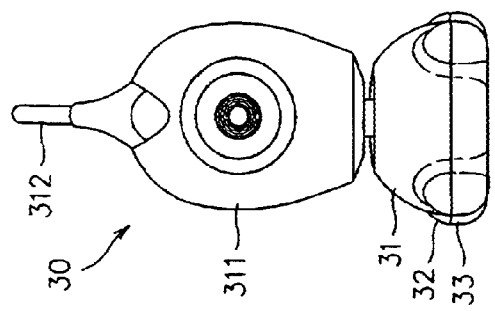
FIG. 3C is a rear view of the support of FIG. 3A.
Figure 3D:
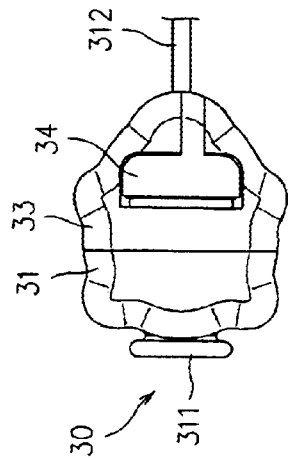
FIG. 3D is a bottom view of the support of FIG. 3A.

Please see FIGS. 3A~3D. The present invention relates to a support 30, which includes a fixing unit 31, a moving unit 32, a primary clamp 33, and an auxiliary clamp 34. The fixing unit 31 couples to an image-capturing device 311, for example, a PC camera, digital camera . . . etc. A cable 312 connected to the image-capturing device 311 is fixed by a fastener 318 for to prevent the cable 312 from being randomly disposed. The cable 312 has a connector that meets USB (universal serial bus) or IEEE (institute of electrical and electronic engineers) specifications so as to enable further connection to a computer system or the like.

The moving unit 32 is located at the rear portion of the fixing unit 31, and the primary clamp 33 and the auxiliary clamp 34 are pivotally connected to the moving unit 32 via a shaft 35, such that the moving unit 32 and the primary clamp 33 constantly and closely contact the fixing unit 31.

Please see FIG. 4A~FIG. 4D, showing the structure for connecting the fixing unit 31, moving unit 32, primary clamp 33 and the auxiliary clamp 34.

The moving unit 32 is located at the rear portion of the fixing unit 31, and a pair of columns 313 of the fixing unit 31 extend toward the moving unit 32. Each of the columns 313 is fitted with a spring 314 that can be contained within a groove 321 together. A positioning block 315, 316 is respectively located at each end of the spring 314 so as to firmly fix the column 313 and spring 314 within the groove 321. Therefore, the moving unit 32 can be forcedly slid away from the fixing unit 31 along the column 313. For .promoting the stability and the strength in movement of the moving unit 32, an extension plate 317 of the fixing unit 31 loosely penetrates a containing portion 322. Please see FIG. 4D. The moving unit 32 including the primary clamp 33 and the auxiliary clamp 34 can be pulled out away from the fixing unit 31 a distance D1 for clamping an object 40 between the fixing unit 31 and the primary clamp 33. Therefore, the image-capturing device 311 can be firmly supported above the object 40 in situations where the object 40 is an LCD display of a notebook computer or other thinner type display.

Figure 4A:
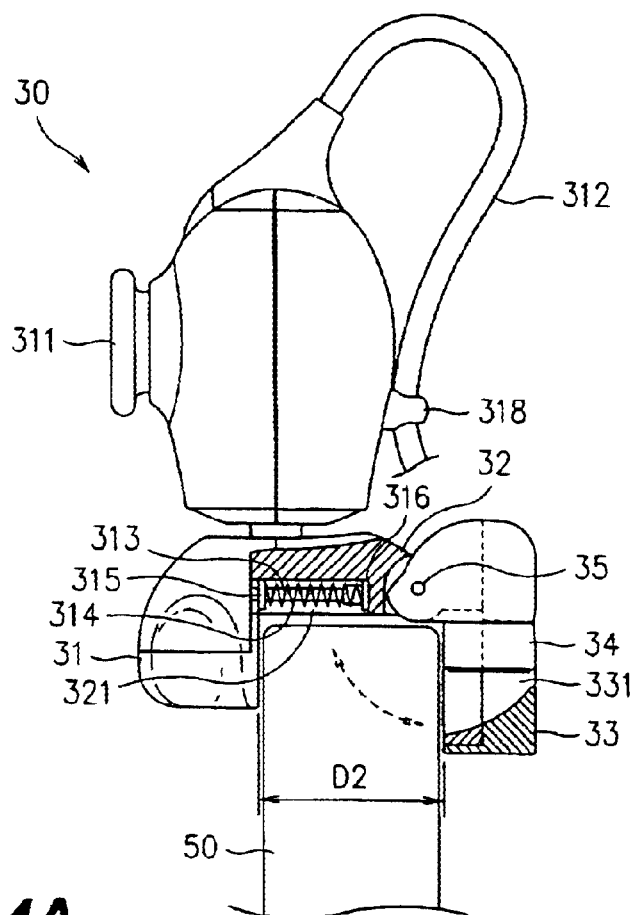
FIG. 4A is a view of the present invention in a clamping state.
Figure 4B:
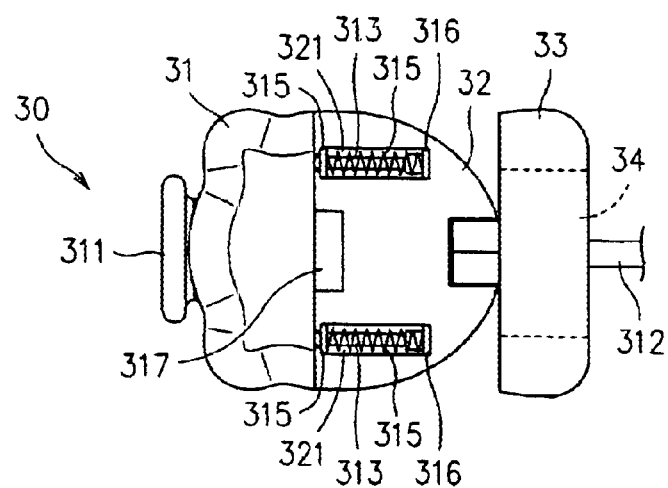
FIG. 4B is another view of the present invention in a clamping state.
Figure 4C:
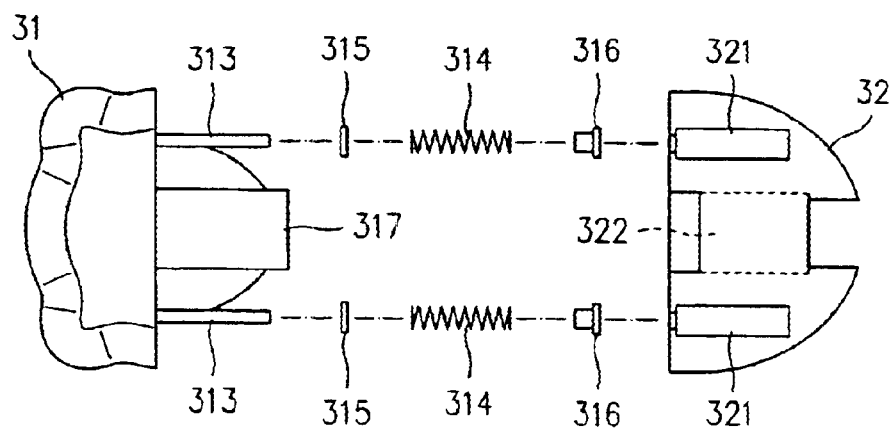
FIG. 4C is an exploded view of the fixing and moving portions of support of the present invention.
Figure 4D:
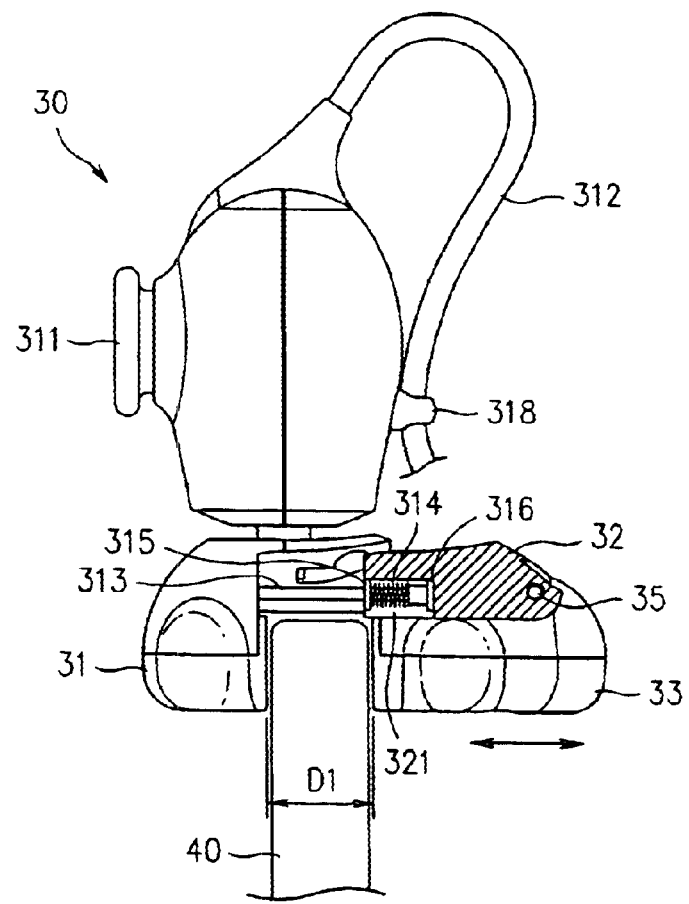
FIG. 4D is a lateral view of the support of the present invention when clamping an object.
Figure 5B:
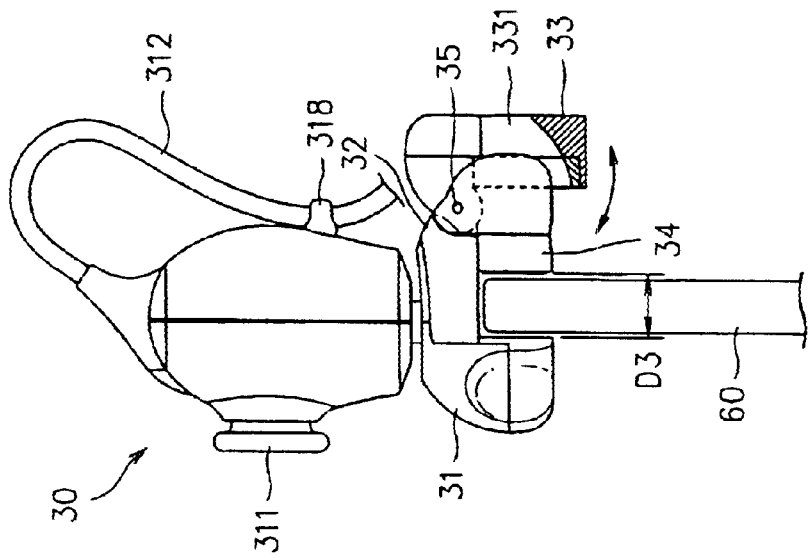
FIG. 5B is another lateral view of the support of the present invention when clamping an object.
Figure 5A:
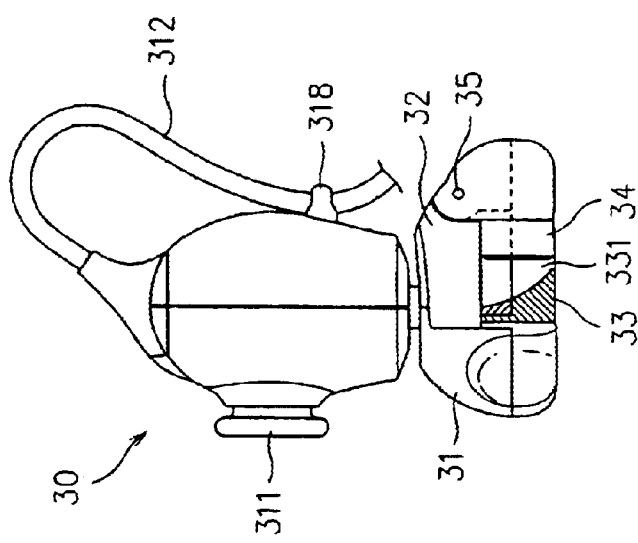
FIG. 5A shows the support of the present invention in a standing state.

In addition, please see FIGS. 4A, 5A and 5B. The primary clamp 33 has an opening 331 for accommodating the auxiliary clamp 34 therein. The primary clamp 33 and the auxiliary clamp 34 have a generally L shape and are pivotally connected to the rear portion of the moving unit 32. As a result, the clamp 33 and 34 can be folded under the extension plate 317 for allowing the standing mode of the support 30 on a plane surface, shown in FIG. 5A.

Furthermore, as shown in FIG. 4A, the primary clamp 33 and the auxiliary clamp 34 can be turned out together to allow a distance D2 for clamping an object 50 that is thicker than the object 40 between the fixing unit 31 and the primary clamp 33 and, as shown in FIG. 5B, the primary clamp 33 can be turned out individually to allow a distance D3 for clamping a thickness smaller than D2, between the fixing unit 31 and the auxiliary clamp 34.

As shown in FIG. 6A, the primary clamp 33 and the auxiliary clamp 34 can be turned out together to allow a distance D4 for clamping a thicker object 70, such as a desk-top LCD display between the fixing unit 31 and the primary clamp 33 or, as shown in FIG. 6B the primary clamp 33 can be turned out individually to allow a distance D5 for clamping another thinner LCD display between the fixing unit 31 and the auxiliary clamp 34.

Having thus described the present invention in sufficient detail to enable those skilled in the art to make and use the invention, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A support with multi-stage clamping mechanism, comprising:

a fixing unit;

a moving unit having at least a resilient element, said moving unit being connected with the fixing unit, wherein a lateral side of the moving unit has a shaft to pivotally connected with a primary clamp; and an auxiliary clamp attached to the primary clamp;

wherein the fixing unit and the moving unit define a first clamping distance via the resilient element;

wherein the primary clamp is arranged to be rotated individually, and the primary clamp and the auxiliary clamp are also arranged to be alternatively rotated together; and whereby the primary clamp and the fixing unit and the auxiliary clamp and the fixing unit further respectively define a second and third clamping distance.

2. The support as claimed in claim 1, wherein the primary clamp and the auxiliary clamp are pivotally connected to the shaft.

3. The support as claimed in claim 1, wherein the primary clamp has a recess for moveablely accommodating the auxiliary clamp.

4. The support as claimed in claim 1, wherein the fixing unit at least has a column fitted with the resilient element; and the moving unit has a corresponding groove for containing the column and the resilient element.

5. The support as claimed in claim 1, wherein the fixing unit has an extension for penetrating a corresponding containing portion located within the moving unit.

6. The support as claimed in claim 1, wherein the primary and auxiliary clamps are arranged to be folded under the fixing unit.

7. The support as claimed in claim 1, wherein the fixing unit couples to an image-capturing device.

* * * * *